United States Patent
Ashibe et al.

(10) Patent No.: US 7,067,739 B2
(45) Date of Patent: Jun. 27, 2006

(54) JOINT STRUCTURE OF SUPERCONDUCTING CABLE AND INSULATING SPACER FOR CONNECTING SUPERCONDUCTING CABLE

(75) Inventors: Yuuichi Ashibe, Osaka (JP); Takato Masuda, Osaka (JP); Yoshihisa Takahashi, Tokyo (JP); Kimiyoshi Matsuo, Tokyo (JP); Shoichi Honjo, Tokyo (JP); Tomoo Mimura, Tokyo (JP)

(73) Assignees: Sumitomo Electric Industries, Ltd., Osaka (JP); The Tokyo Electric Power Company, Incorporated, Tokyo (JP)

( * ) Notice: Subject to any disclaimer, the term of this patent is extended or adjusted under 35 U.S.C. 154(b) by 74 days.

(21) Appl. No.: 10/840,232

(22) Filed: May 7, 2004

(65) Prior Publication Data

US 2004/0259408 A1    Dec. 23, 2004

(30) Foreign Application Priority Data

Jun. 19, 2003   (JP)   .............................. 2003-174244

(51) Int. Cl.
    *H01R 4/00*   (2006.01)
(52) U.S. Cl. ...................... 174/84 R; 174/85; 174/88 R
(58) Field of Classification Search .............. 174/74 R, 174/74 A, 75 R, 75 F, 80, 84 R, 84 S, 85, 174/88 R, 90
    See application file for complete search history.

(56) References Cited

U.S. PATENT DOCUMENTS

| 6,112,531 | A | * | 9/2000 | Yamaguchi | .................. 62/51.1 |
| 2003/0040439 | A1 | | 2/2003 | Castiglioni et al. | |
| 2004/0211586 | A1 | * | 10/2004 | Sinha et al. | ............. 174/125.1 |

FOREIGN PATENT DOCUMENTS

| DE | 44 30 408 A1 | 7/1995 |
| DE | WO 02/029930 A3 * | 4/2002 |
| WO | WO 02/29930 A2 | 4/2002 |

OTHER PUBLICATIONS

Takato Masuda et al., "Verification Tests of 3-core 66kV HTS Cable System for Practical Use," The Papers of Joint Technical Meeting on Application of Superconductivity and Linear Drives, IEE Japan, (Jan. 24, 2002), pp. 19-24, The Institute of Electrical Engineers of Japan.

* cited by examiner

*Primary Examiner*—William H. Mayo, III
(74) *Attorney, Agent, or Firm*—Foley & Lardner LLP

(57) ABSTRACT

A joint structure of a superconducting cable having improved connection strength and preventing break of a superconducting layer is provided. A central conductor of an insulating spacer and a superconducting cable are connected via a conductor connecting member having a sleeve-shaped end. Specifically, the central conductor of the insulating spacer and the conductor connecting member are connected by multi-contact connection.

20 Claims, 3 Drawing Sheets

JOINT STRUCTURE OF SUPERCONDUCTING CABLE AND INSULATING SPACER FOR CONNECTING SUPERCONDUCTING CABLE

BACKGROUND OF THE INVENTION

1. Field of the Invention

The present invention relates to a joint structure and an insulating spacer applied for connection of a superconducting cable. More particularly, the present invention relates to a structure connecting a superconducting cable terminal to a central conductor of an insulating spacer for use in insulating the superconducting cable terminal from a grounded portion, at a terminating portion of the superconducting cable or at a connecting portion of two superconducting cables, and the insulating spacer for use in such connection.

2. Description of the Background Art

FIG. 6 is a perspective view of a representative example of a superconducting cable. The superconducting cable has a former 40 made of a metal wire at the core, and a superconducting layer (a superconducting wire) 41 covering former 40. Superconducting layer 41 generally consists of a tape-shaped superconducting wire 42 having superconducting filaments provided therein, which is wound around the former in a spiral fashion in a plurality of (in this example, four) layers, with the spiral pitches slightly changed from each other. Superconducting layer 41 is covered with a shield layer 44 via an insulating layer 43.

Shield layer 44 is for shielding the electric field generated from superconducting layer 41. Shield layer 44 generally consists of a tape-shaped superconducting wire having superconducting filaments provided therein, as in the case of superconducting layer 41. The tape-shaped wire is wound spirally in a plurality of (in this example, two) layers, with the spiral pitches slightly changed from each other. A protecting layer 45 further covers shield layer 44.

FIG. 7 shows a representative example of a terminating portion for connecting a superconducting cable for electric power transmission to a current lead for drawing out a current to an external current system. At a terminal portion 53 of the superconducting cable, the protective layer, the insulating layer and others of superconducting cable 51 are removed and replaced with a supplementary insulating paper 52. Provided further outside is a coolant 58 such as liquid nitrogen for cooling superconducting cable terminal portion 53. Superconducting cable 51 is connected to current lead 55 through a conductor that is connected to its terminal portion 53. This connection is secured inside a lower electric shield 54 to prevent leakage of the electric field to the outside.

Current lead 55 is covered with a bushing 56 made of FRP (fiber reinforced plastic) or the like to control leakage of the electric field. At an upper portion of the terminating portion, current lead 55 is further covered with porcelain insulator 57. The lower portion of current lead 55 and lower electric shield 54 are cooled with coolant 58 such as liquid nitrogen. A coolant tank 59 is provided within a vacuum chamber 60 for thermal insulation.

In such a terminating portion, coolant tank 59 and vacuum chamber 60 are grounded, which need to be insulated from superconducting cable terminal portion 53. An insulating spacer 61 is used for such insulation. Generally, insulating spacer 61 is made of epoxy resin (and thus called an "epoxy unit"), and is shaped thicker in the middle and tapered like cones at respective ends. A central conductor is provided at the core of insulating spacer 61 to let electricity flow therethrough.

The end of superconducting cable terminal portion 53 is connected to an end of this central conductor. The other end of the central conductor is guided into lower electric shield 54 and connected directly or indirectly to current lead 55.

Although there has not yet been presented any joint structure of a central conductor of an insulating spacer and an end portion of a superconducting cable, in an OF cable, CV cable or the like of normal conducting type, the central conductor and the cable end are normally connected by compression via a compression sleeve.

The above-described technique is disclosed in the following document:

Masuda et al., "Verification Tests of 3-core 66 kV HTS Cable System for Practical Use", The Papers of Joint Technical Meeting on Application of Superconductivity and Linear Drives, IEE Japan, The Institute of Electrical Engineers of Japan, Jan. 24, 2002, Document No. ASC—$O_2$-4, LD-$O_2$-4, page 20.

SUMMARY OF THE INVENTION

When the above-described method of connecting the central conductor of the insulating spacer with a normal conducting cable end is employed for connection with a superconducting cable end, however, a superconducting layer (superconducting wire) within the superconducting cable is prone to damage, in which case superconductivity cannot be guaranteed. Further, it is difficult to directly connect the central conductor of the insulating spacer, generally made of a metal having aluminum or copper as its main body, with the superconducting cable completely different in material and structure therefrom.

Through investigation in an effort to find a connecting method not posing such problems, the inventors have found that those problems can be solved by making connection between the central conductor and the superconducting cable terminal via a conductor connecting member having an end, particularly both ends, in a sleeve shape (which corresponds to a first embodiment of the present invention).

This connecting method, however, still poses the following problems:

It is often difficult to connect the central conductor of the insulating spacer to the conductor connecting member by using welding, particularly welding employing an electron beam (EB welding), soldering or the like at a site where a terminating portion is to be placed, since welding, in particular EB welding, requires special devices and techniques; and Connection of sufficient strength cannot be achieved with soldering or the like if the central conductor of the insulating spacer and the conductor connecting member are formed of different materials.

Further, in the case where a conductor connecting member and a superconducting cable terminal portion are connected by compression, by inserting the superconducting cable terminal portion into a concave portion of the conductor connecting member and compressing the concave portion from the outside, a superconducting layer (superconducting wire) within the superconducting cable may well be broken, which leads to impairment of superconductivity, as in the case described above.

Moreover, the entire joint structure would be elongated, since the connection length in a longitudinal direction of the cable is increased by the length of the conductor connecting member.

Based on the foregoing, an object of the present invention is to provide a superconducting cable terminal structure capable of passing a large amount of current therethrough and solving the above-described problems.

The first embodiment of the present invention is a joint structure of a superconducting cable, in which a central conductor of an insulating spacer and a superconducting cable are connected via a conductor connecting member having its end in a sleeve shape.

Second and third embodiments of the present invention are preferable embodiments of the first embodiment, in which the central conductor of the insulating spacer and the conductor connecting member are connected by multi-contact connection or by friction bonding. Each embodiment provides a joint structure of a superconducting cable which allows easy connection between the central conductor of the insulating spacer and the conductor connecting member with sufficient strength, even at a site for setting up a terminating portion, or even if the central conductor and the conductor connecting member are made of different materials.

The inventors have accomplished the second and third embodiments of the present invention through the findings that strength, durability and current properties required for the connection between the central conductor of the insulating spacer and the conductor connecting member can be obtained at equal or higher levels by multi-contact connection or friction welding compared to the conventional EB welding or soldering.

Specifically, the second embodiment of the present invention corresponds to a joint structure of a superconducting cable where a central conductor of an insulating spacer and a superconducting cable are connected via a conductor connecting member having its end in a sleeve shape, in which the central conductor of the insulating spacer and the conductor connecting member are connected by multi-contact connection.

The third embodiment of the present invention corresponds to a joint structure of a superconducting cable where a central conductor of an insulating spacer and a superconducting cable are connected via a conductor connecting member having its end in a sleeve shape, in which the central conductor of the insulating spacer and the conductor connecting member are connected by friction welding.

Next, a fourth embodiment of the present invention relates to connection between a superconducting cable and a conductor connecting member. It provides a joint structure of a superconducting cable where a former of the superconducting cable and the conductor connecting member are connected by compression, the conductor connecting member and a superconducting layer are connected by soldering or brazing, so that the conductor connecting member and the superconducting cable are connected with sufficient strength without damaging the superconducting layer.

Specifically, the fourth embodiment of the present invention corresponds to a joint structure of a superconducting cable where a superconducting cable and a long conductor are connected via a conductor connecting member, in which an end portion of a former of the superconducting cable and the conductor connecting member are connected by compression, and a superconducting layer provided on the outer periphery of the former and the conductor connecting member are connected by soldering or brazing.

Here, although the long conductor may be a central conductor of an insulating spacer, not limited thereto, it may be an end of a normal conducting cable or another superconducting cable.

A fifth embodiment of the present invention provides a joint structure of a superconducting cable that is short in length in a longitudinal direction of the cable, in which a hollow tube is provided at the core of an insulating spacer, and a connecting portion of a conductor connecting member and the superconducting cable is arranged within the hollow tube.

Specifically, the fifth embodiment of the present invention corresponds to a joint structure of a superconducting cable where a superconducting cable and a long conductor are connected via a conductor connecting member, in which a connecting portion between the conductor connecting member and the superconducting cable is arranged inside a hollow tube that is provided at the core of an insulating spacer.

Such provision of the connecting portion of the conductor connecting member and the long conductor within the hollow tube is advantageous in that the length of the joint structure in a longitudinal direction of the cable is shortened. A material of the hollow tube is not restricted to a conductor.

A sixth embodiment of the present invention employs a central conductor having a superconducting layer as the central conductor of the insulating spacer, to achieve more effective connection of the superconducting cable from the standpoint of current-carrying capacity.

Specifically, the sixth embodiment of the present invention corresponds to an insulating spacer for connecting a superconducting cable, having a central conductor to be connected to a superconducting cable, the central conductor having a superconducting layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings.

Firstly, first through third embodiments of the present invention are described.

Figure 1:
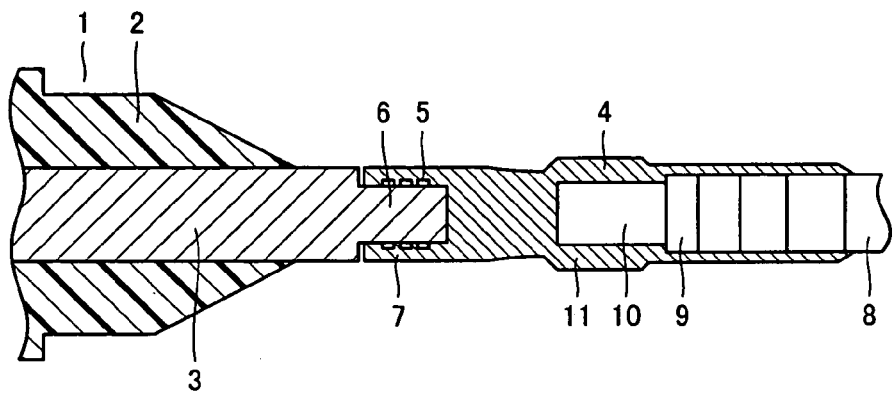
FIGS. 1–5 show various examples of the present invention.

FIG. 1 shows an example of a joint structure of a superconducting cable according to the first, second and fourth embodiments of the present invention. In this example, an insulating spacer 1 is formed of a resin portion 2 and a solid central conductor 3. Epoxy resin is normally used for resin portion 2.

Central conductor 3 is made of a metal that attains low resistance at a low temperature, which may be a metal having copper or aluminum as its main body. Among others, a metal having aluminum as its main body is employed preferably. Here, the metal having aluminum as its main body includes a simple substance of aluminum and an alloy having aluminum as its primary component.

A conductor connecting member 4 is made, e.g., of a metal having copper or aluminum as its main body. Among others, a metal having copper as its main body is preferably used. Here, the metal having copper as its main body includes a simple substance of copper and an alloy having copper as its primary component.

In the case where a metal having aluminum as its main body is used for central conductor 3 and a metal having copper as its main body is used for conductor connecting member 4, it is difficult to achieve connection of sufficient strength with soldering or brazing between the metals of different kinds. To solve this problem, the second embodiment of the present invention employs multi-contact connection as described above.

Specifically, in the example shown in FIG. 1, multi-contact connection is used for connection between central conductor 3 and conductor connecting member 4. More specifically, conductor connecting member 4 has a concave portion 7 at its end. Concave portion 7 has an inner periphery provided with three grooves 5, with a conductive elastic body (not shown) inserted therein. Provided at an end of central conductor 3 is a projecting portion 6 having a diameter slightly smaller than the inner diameter of concave portion 7. Projecting portion 6 is inserted into concave portion 7.

The use of multi-contact connection facilitates connection between central conductor 3 and conductor connecting member 4 even at a site for setting up the terminating portion. The connecting portion can pass a large amount of current therethrough. With this multi-contact connection, however, projecting portion 6 inserted in concave portion 7 (connecting hole) is held only by elasticity of the conductive elastic body, leaving a possibility that projecting portion 6 may fall off. Thus, a latch mechanism (not shown) such as a locknut, a latch ring or the like is preferably used in the multi-contact connecting portion to prevent projecting portion 6 from slipping off. For example, male screws may be provided on the surfaces of central conductor 3 at the connecting portion and conductor connecting member 4, and a connecting nut having locknuts at its both ends may be used to connect them. Tightened with the male screws, the locknuts exert the clamping force for latching.

Although the example of FIG. 1 has three grooves 5, not limited thereto, one or more grooves may be provided as appropriate. Grooves 5 may be provided on the outer periphery of concave portion 7, instead of the inner periphery thereof. In this example, central conductor 3 is provided with projecting portion 6 and conductor connecting member 4 is provided with concave portion 7. Alternatively, central conductor 3 may be provided with a concave portion and conductor connecting member 4 may be provided with a projecting portion.

In the third embodiment of the present invention, central conductor 3 and conductor connecting member 4 are connected to each other by friction welding, rather than multi-contact connection. In the friction welding, portions of the members to be connected (in the example of FIG. 1, central conductor 3 and conductor connecting member 4) are brought into contact with each other, and one of the two members is rotated (or the both members are rotated at different speeds in different directions from each other) to generate heat by contact friction. With the rotation stopped, the members are bonded by means of the frictional heat generated and a pressure applied to the connecting portion. With this friction welding, again, the connection between central conductor 3 and conductor connecting member 4 can readily be achieved even at a site where the terminating portion is to be placed, and the connecting portion allows a large amount of current to flow therethrough.

Hereinafter, a fourth embodiment of the present invention is described.

Figure 6:
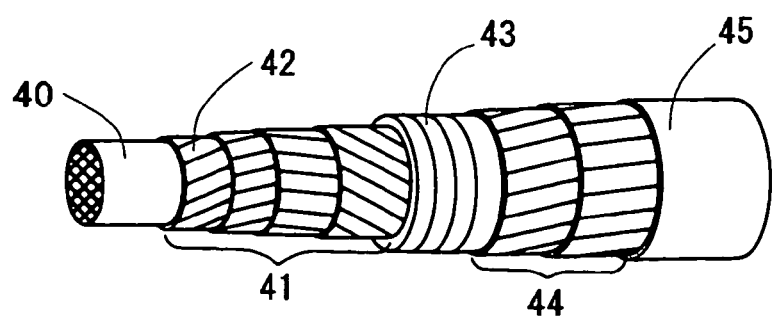
FIG. 6 is a perspective view of an example of a conventional superconducting cable.
Figure 7:
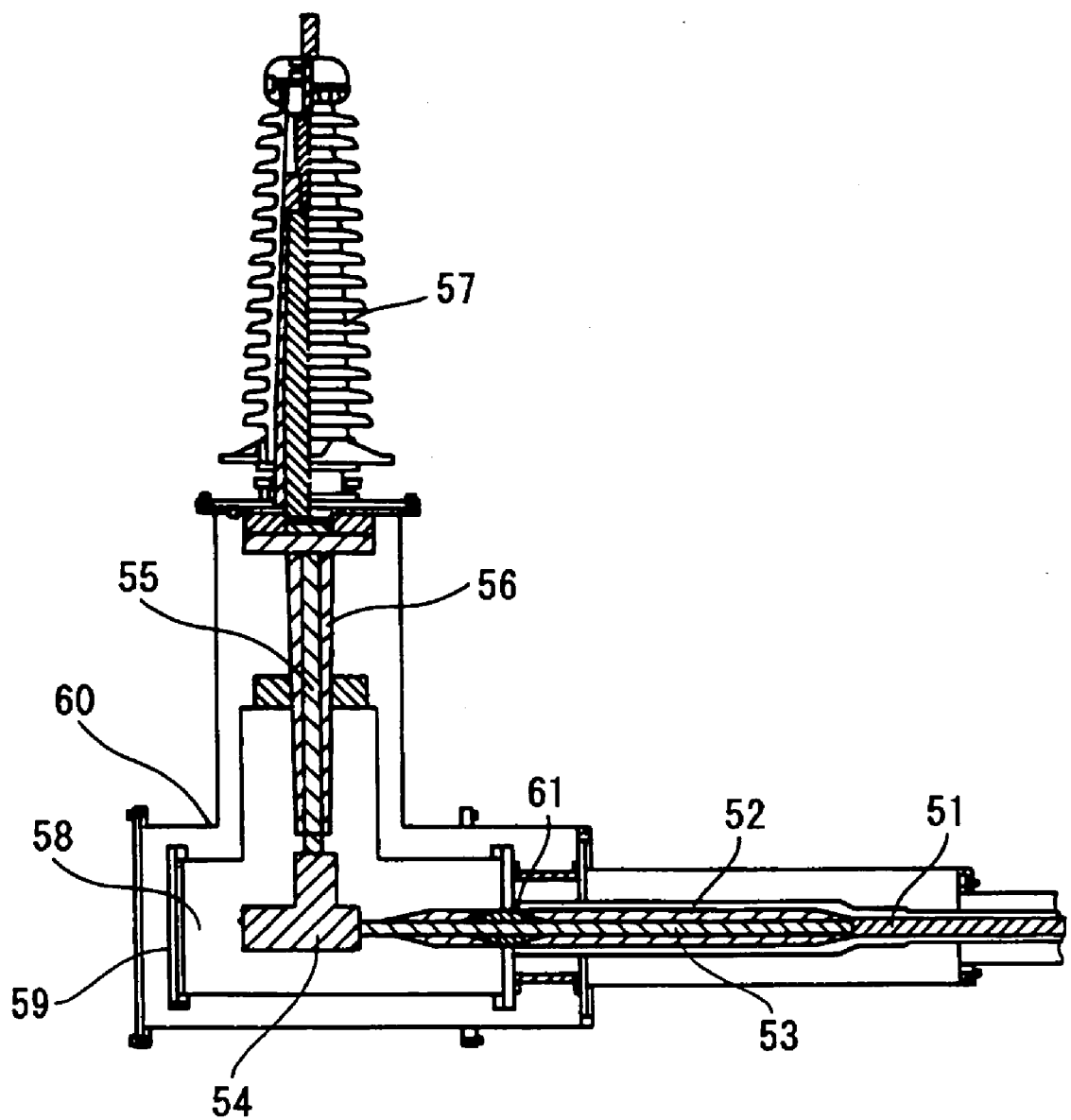
FIG. 7 shows an example of a conventional terminating portion for a superconducting cable.

Conductor connecting member 4 shown in FIG. 1 has its other terminal connected to a terminal of superconducting cable 8. Superconducting cable 8 in the example of FIG. 1 has a structure similar to that of the conventional superconducting cable shown in FIG. 6.

Specifically, superconducting cable 8 of the fourth embodiment has a former 10 made of a metal wire at the core, which is covered with a superconducting layer 9, an insulating layer, a shield layer and a protective layer in this order. At the portion to be connected with conductor connecting member 4, the insulating layer, the shield layer and the protective layer are removed, and the respective layers of superconducting layer 9 and former 10 are exposed stepwise.

Superconducting layer 9 is connected to conductor connecting member 4 by soldering. In the example shown in FIG. 1, superconducting layer 9 is formed in four layers, which are each connected to conductor connecting member 4 by soldering. Although soldering is employed in the present example, brazing such as silver brazing may also be used.

Former 10 is connected to conductor connecting member 4 by compression. Specifically, conductor connecting member 4 has a concave portion 11, into which former 10 is inserted, and conductor connecting member 4 is compressed from the outside of the insert portion to thereby connect conductor connecting member 4 with former 10.

In the present example, superconducting layer 9 and conductor connecting member 4 are connected, not by compression, but by soldering or the like. This prevents the superconducting layer from suffering damages, which would otherwise be caused by application of conventional techniques. The connection can also pass a large amount of current therethrough. On the other hand, former 10 and conductor connecting member 4 are connected by compression, ensuring connection of sufficient strength. As such, connection having sufficient strength and capable of passing a large mount of current therethrough is achieved between superconducting cable 8 and conductor connecting member 4, without damaging the superconducting layer.

Central conductor 3 may be a hollow tube. In such a case, the skin effect of the current will prevent considerable reduction of current-carrying capacity.

A fifth embodiment of the present invention is now described.

Figure 2:
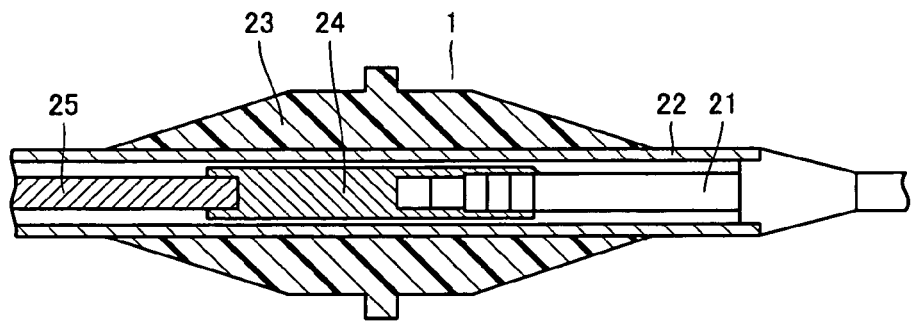

FIG. 2 shows an example of the fifth embodiment of the present invention. As shown in FIG. 2, a terminal of a superconducting cable 21 and a conductor connecting member 24 are connected to each other inside a hollow tube 22. Although the structure of the connecting portion is not specifically restricted, the example of FIG. 2 has a structure similar to that shown in FIG. 1. When the connecting portion is arranged inside hollow tube 22, the joint structure of the superconducting cable can be decreased in length by the lengths of conductor connecting member 24 and the terminal portion of superconducting cable 21.

In the example shown in FIG. 2, the other end of conductor connecting member 24 is connected to another long conductor 25. Although the structure of the connecting portion is not specifically restricted, multi-contact connection or the like may be employed. In such a case that conductor connecting member 24 is connected to other long conductor 25, hollow tube 22 does not necessarily have to be a conductor, and it may be an insulator. For example, it may be a tube formed of a resin of the resin portion 23 of the insulating spacer.

Alternatively, a tube of a conductor such as aluminum may be used as hollow tube 22, and hollow tube 22 and conductor connecting member 24 may be connected to allow a large amount of current to pass therethrough. Further, hollow tube 22 may also serve as a central conductor of the insulating spacer.

Although the portion where conductor connecting member 24 is connected to other long conductor 25 may not necessarily be arranged inside hollow tube 22, such arrangement inside hollow tube 22 as in the example of FIG. 2 can further reduce the length of the joint structure of the superconducting cable.

Figure 3:
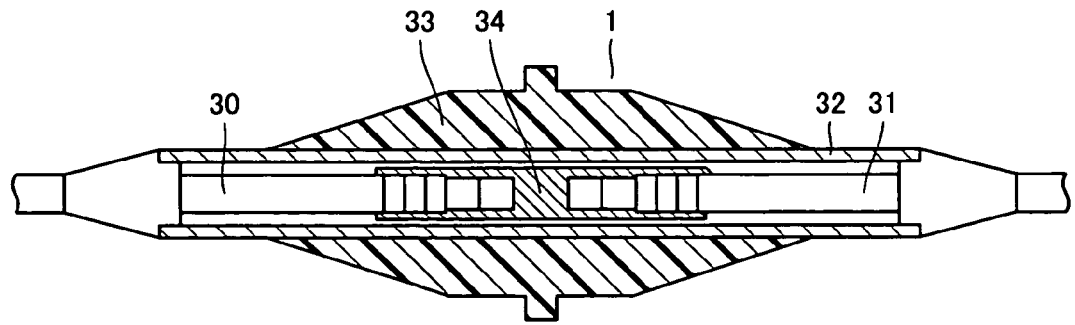

FIG. 3 shows an example of connection between superconducting cables according to the fifth embodiment. In this example, superconducting cables 30 and 31 are connected to each other by a conductor connecting member 34 inside a hollow tube 32 of an insulating spacer that is formed of a resin portion 33 and hollow tube 32.

A sixth embodiment of the present invention is now described.

In the sixth embodiment of the present invention, in the joint structure of the superconducting cable shown in FIG. 1, central conductor 3 has a superconducting layer (superconducting wire) that becomes superconductive in the environment where the joint structure of the superconducting cable of the present invention is used. If central conductor 3 is unprovided with such a superconducting layer and does not have a sufficiently large cross sectional area, a large amount of current passed therethrough will generate a large amount of heat. This may cause, e.g., breakdown due to evaporation of the coolant such as liquid nitrogen, and thus, a refrigerator of large capacity should be used to avoid the problem.

On the other hand, if the cross sectional area of central conductor 3 is increased to ensure high current-carrying capacity, insulating spacer 1 as a whole will be increased in size, posing a problem that resin portion 2 may suffer cracking due to a difference in thermal contraction between central conductor 3 and the resin during cooling. If central conductor 3 is provided with a superconducting layer, the superconducting layer can let a large amount of current pass therethrough without generating heat, which advantageously eliminates the need of increasing the cross sectional area of central conductor 3.

As a way of providing central conductor 3 with a superconducting layer, a method of embedding a superconducting wire in central conductor 3 by soldering the superconducting wire along central conductor 3 has been presented. The insulating spacer having such a superconducting layer at its central conductor may be used, not only in the first through fifth embodiments of the present invention described above, but also in the case where a superconducting cable terminal is connected to the central conductor without interposition of a conductor connecting member. These cases all enjoy the benefits that a large amount of current can be passed without generation of heat and that it is unnecessary to increase the cross sectional area of the central conductor.

The joint structure of a superconducting cable according to each of the first through sixth embodiments of the present invention is applicable to both the connection between a superconducting cable and a normal conducting cable and the connection between superconducting cables.

The joint structure of a superconducting cable according to each of the first and second embodiments, characterized in that multi-contact connection or friction welding is used for connection between the central conductor of the insulating spacer and the conductor connecting member, allows a large amount of current to pass therethrough.

It also facilitates connection between the central conductor and the conductor connecting member, even at a site where the terminating portion is to be placed or even if the central conductor and the conductor connecting member are made of different materials, and ensures sufficient strength of the connection.

The joint structure of a superconducting cable according to the fourth embodiment of the present invention, characterized in that the conductor connecting member and an end of the former of the superconducting cable are connected by compression and the conductor connecting member and an end of the superconducting layer are connected by soldering or brazing, allows a large amount of current to pass therethrough. The conductor connecting member and the superconducting cable are connected to each other with higher strength, without damaging the superconducting wire.

The joint structure of a superconducting cable according to the fifth embodiment of the present invention, characterized in that the connecting portion between the conductor connecting member and the superconducting cable is arranged inside a hollow tube at the core of the insulating spacer, has a shorter connection length in a longitudinal direction of the cable, so that the joint structure as a whole can be shortened.

The insulating spacer for connecting a superconducting cable according to the sixth embodiment of the present invention, having a superconducting layer provided at the central conductor of the insulating spacer, allows a large amount of current to pass therethrough, and the cross sectional area of the central conductor can be reduced. As such, the insulating spacer as a whole can be downsized, and crack of the resin portion thereof can be prevented.

Figure 4:
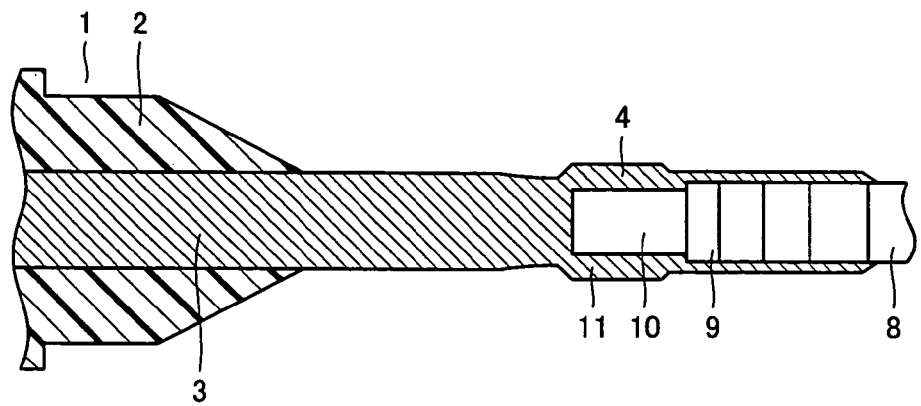

FIG. 4 shows another example of the present invention. In FIG. 4, a resin portion 2, a central conductor 3, a conductor connecting member 4 and a concave portion 11 are shown in cross section, while a former 10, a superconducting layer 9 and a superconducting cable 8 are shown in side view. As shown in FIG. 4, former 10 and concave portion 11 of conductor connecting member 4 are connected by compression. By comparison, superconducting layer 9 and concave portion 11 are connected by applying a melt solder therebetween. Conductor connecting member 4 and central conductor 3 are formed in one piece. Superconducting layer 9 is arranged on the outer periphery of former 10.

Figure 5:
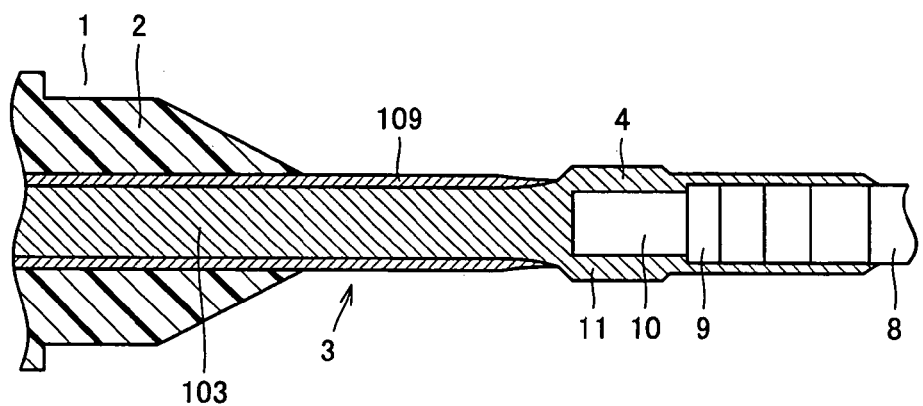

FIG. 5 shows yet another example of the present invention. In FIG. 5, again, former 10, superconducting layer 9 and superconducting cable 8 are shown in side view, and other configurations are shown in cross section, in the same manner as in FIGS. 1-3. In FIG. 5, a superconducting wire 109 is embedded in central conductor 3. Specifically, superconducting wire 109 is embedded in advance in central conductor 3, and a resin portion 2 constituting the epoxy unit is injection molded. Central conductor 3 is formed of a conductor 103 and superconducting wire 109.

As described above, according to the present invention, as shown in FIG. 1, the joint structure of a superconducting cable includes an insulating spacer 1 having a central conductor 3, a superconducting cable 8, and a conductor connecting member 4 having a concave portion 7 at one end and a concave portion 11 at another end. Concave portion 7 has a sleeve shape and is connected to central conductor 3. Concave portion 11 also has a sleeve shape and is connected to superconducting cable 8.

Central conductor 3 of insulating spacer 1 may be connected to conductor connecting member 4 by multi-contact connection.

Central conductor 3 of insulating spacer 1 may be connected to conductor connecting member 4 by friction welding.

Central conductor 3 of insulating spacer 1 may be made of a metal having aluminum as its main body. Conductor connecting member 4 may be made of a metal having copper as its main body.

Referring to FIG. 4, the joint structure of a superconducting cable according to the present invention includes a superconducting cable 8, a central conductor 3 as a long conductor, and a conductor connecting member 4 connecting superconducting cable 8 and central conductor 3. Superconducting cable 8 includes a former 10 and a superconducting layer 9 provided on the outer periphery of former 10. An end of former 10 and conductor connecting member 4 are connected by pressure welding, and superconducting layer 9 and conductor connecting member 4 are connected by soldering or brazing.

The long conductor constitutes central conductor 3 of insulating spacer 1.

Referring to FIG. 2, the joint structure of a superconducting cable according to the present invention includes a superconducting cable 21, a long conductor 25, a conductor connecting member 24 connecting superconducting cable 21 and long conductor 25, and an insulating spacer 1 covering conductor connecting member 24. The connecting portion of conductor connecting member 24 and superconducting cable 21 is arranged inside a hollow tube 22 that is provided at the core of insulating spacer 1.

The connecting portion of conductor connecting member 24 and long conductor 25 may also be arranged inside hollow tube 22 provided at the core of insulating spacer 1.

Referring to FIG. 5, the insulating spacer for connecting a superconducting cable according to the present invention is an insulating spacer 1 having a central conductor 3 to be connected to a superconducting cable 8. Central conductor 3 has a superconducting wire 109.

Referring to FIG. 1, the insulating spacer for connecting a superconducting cable according to the present invention is an insulating spacer 1 having a central conductor 3. Central conductor 3 is connected to a superconducting cable 8 via a conductor connecting member 4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A joint and cable structure comprising:
   a superconducting cable;
   a long conductor;
   a conductor connecting member connecting said superconducting cable and said long conductor; and
   an insulating spacer covering said conductor connecting member, wherein
   a connecting portion of said conductor connecting member and said superconducting cable is arranged inside a hollow tube that is provided at a core portion of said insulating spacer; and
   wherein said insulating spacer covers a region extending at least from a connected portion of said superconducting cable and said conductor connecting member to a connected portion of said long conductor and said conductor connecting member.

2. The joint and cable structure according to claim 1, wherein a connecting portion of said conductor connecting member and said long conductor is arranged inside the hollow tube provided at the core portion of said insulating spacer.

3. The joint and cable structure according to claim 1, wherein the conductor connecting member comprises a multi-contact connection to said long conductor.

4. The joint and cable structure according to claim 1, wherein said hollow tube is composed of an electrical insulating material.

5. The joint and cable structure according to claim 4, wherein said hollow tube is composed of a resin material.

6. The joint and cable structure according to claim 4, wherein said hollow tube is composed of the same material as said insulating spacer.

7. The joint and cable structure according to claim 1, wherein said insulating spacer is composed of an epoxy resin material.

8. The joint and cable structure according to claim 1, wherein said insulating spacer has a middle section and two opposite ends, wherein the middle section is thicker than ends.

9. The joint and cable structure according to claim 8, wherein said ends of the insulating spacer are tapered.

10. The joint and cable structure according to claim 1, wherein said hollow tube is composed of an electrically conductive material.

11. The joint and cable structure according to claim 1, wherein said hollow tube is composed of an electrically conductive aluminum material.

12. A joint structure for coupling a superconducting cable and a further cable together, the joint structure comprising:
    a conductor connecting member for connecting a superconducting cable and a further conductor; and
    an insulating spacer covering at least a portion of the conductor connecting member, the insulating spacer including a core portion and a hollow tube located at least partially in the core portion;
    wherein the conductor connecting member has a pair of connecting portions disposed within the hollow tube for connecting to the superconducting cable and the further cable, respectively; and
    wherein the insulating spacer covers a portion of the conductor member that extends at least from the connecting portion of the conductor connecting member and the superconducting cable to the connecting portion of the conductor connecting member and the further cable.

13. The joint structure according to claim 12, wherein the connecting portion of the conductor connecting member and the long conductor is arranged inside the hollow tube provided at the core portion of said insulating spacer.

14. The joint structure according to claim 12, wherein the conductor connecting member comprises a multi-contact connection to the further conductor.

15. The joint structure according to claim 12, wherein said hollow tube is composed of an electrical insulating material.

16. The joint structure according to claim 15, wherein said hollow tube is composed of a resin material.

17. The joint structure according to claim 15, wherein said hollow tube is composed of the same material as said insulating spacer.

18. The joint structure according to claim 12, wherein said hollow tube is composed of an electrically conductive material.

19. The joint structure according to claim 18, wherein said ends of the insulating spacer are tapered.

20. The joint structure according to claim 12, wherein said hollow tube is composed of an electrically conductive aluminum material.

* * * * *